Jan. 20, 1948.  J. M. EWART  2,434,689
CONTROL MECHANISM FOR POWER-OPERATED GUNS
Filed Feb. 5, 1944  4 Sheets-Sheet 1

Inventor
John M. Ewart
By his Attorney

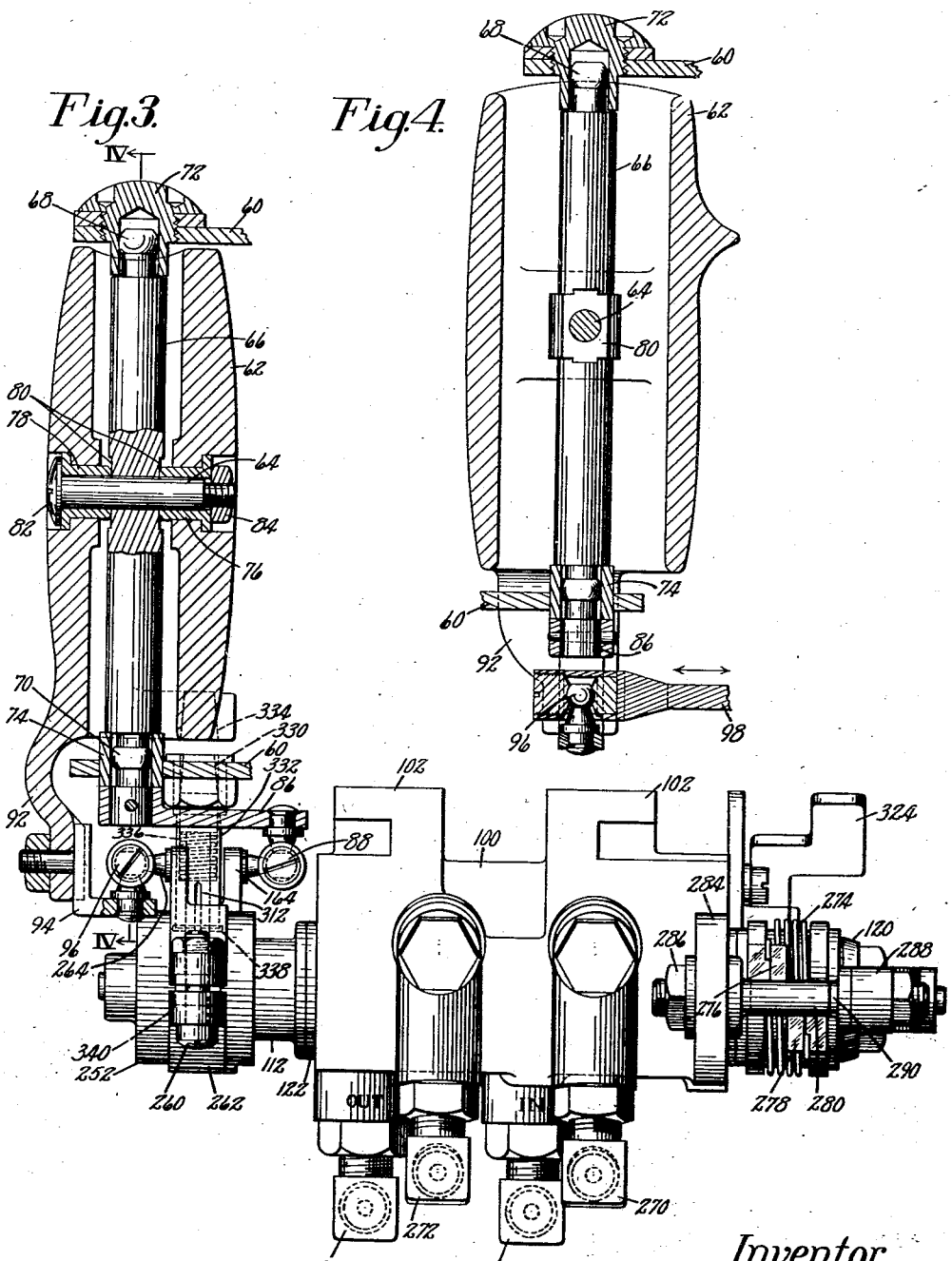

Jan. 20, 1948. J. M. EWART 2,434,689
CONTROL MECHANISM FOR POWER-OPERATED GUNS
Filed Feb. 5, 1944 4 Sheets-Sheet 4

Inventor
John M. Ewart
By his Attorney

Patented Jan. 20, 1948

2,434,689

UNITED STATES PATENT OFFICE 2,434,689

CONTROL MECHANISM FOR POWER-OPERATED GUNS

John M. Ewart, Beverly, Mass., assignor to United Shoe Machinery Corporation, Flemington, N. J., a corporation of New Jersey Application February 5, 1944, Serial No. 521,254

7 Claims. (Cl. 89—41)

This invention relates to control mechanisms and particularly to apparatus for controlling the direction, speed and extent of operation of a plurality of motor devices. The invention is herein illustrated as applied to apparatus for controlling fluid-pressure-operated motors for elevating and for swinging in azimuth a multiple machine gun mount; although it is to be understood that the invention in its broader aspects is not limited to such use but is applicable to other types of apparatus as well as to the control of the power movement of different devices.

In one aspect this invention represents improvements in certain features of an apparatus for so controlling power-operated means for moving a device, such as, for example, a gun, in different paths that the operator may have the same continuous and direct control over the power movements of the device as he would have if he were actually moving it by hand. Such an apparatus is disclosed in United States Letters Patent No. 2,411,270, granted November 19, 1946, in the names of F. V. Hart et al.

An object of this invention is to provide an improved control member which is so mounted on the device, the movements of which it controls, that vibrations, or other extraneous movements of the device, are ineffective to disturb the accuracy, or to interrupt the continuity, of the control functions of the member. To this end, and in accordance with a feature of this invention, a control handle having a body portion provided with an outer surface adapted to be grasped by the hand of the operator is so mounted on the device for universal movement about two intersecting axes that the point of intersection of these axes is within the body portion of the handle. With this arrangement the operator's hand is caused to follow all movements of the device so that the control function of the handle is not disturbed, or interrupted, thereby.

The apparatus disclosed in the aforementioned patent is arranged to control the flow of pressure fluid to, and exhaust from, fluid-pressure-operated motors, by means of valves having control elements which are selectively displaced by movements of the control handle. These control elements are spring returned to neutral positions for cutting off both the flow of pressure-fluid to, and its exhaust from, the motors, thus to hold the guns fixed. Another object of this invention is to provide novel and improved means for thus returning the control elements which may be readily adjusted accurately to bring these elements to neutral position when the control handle is released.

A further object of this invention is to provide, in apparatus for controlling the operation of fluid-pressure-operated motors for moving a device, means for permitting the device to be moved by hand. To this end, the herein illustrated apparatus is provided with novel means for connecting the fluid-pressure motors to exhaust, thus freeing the device for direct manual movement, together with means for locking the control handle, to facilitate such manual movement.

These and other objects and features of the invention will be apparent in the following detailed description of the embodiment of the invention illustrated in the accompanying drawings, and will be pointed out in the claims.

In the drawings,

Fig. 3 is a view in real elevation of the control mechanism, with parts in section;

Fig. 4 is a sectional view of a part of the control mechanism taken on line IV—IV of Fig. 3, looking in the direction of the arrows;

Figure 1:
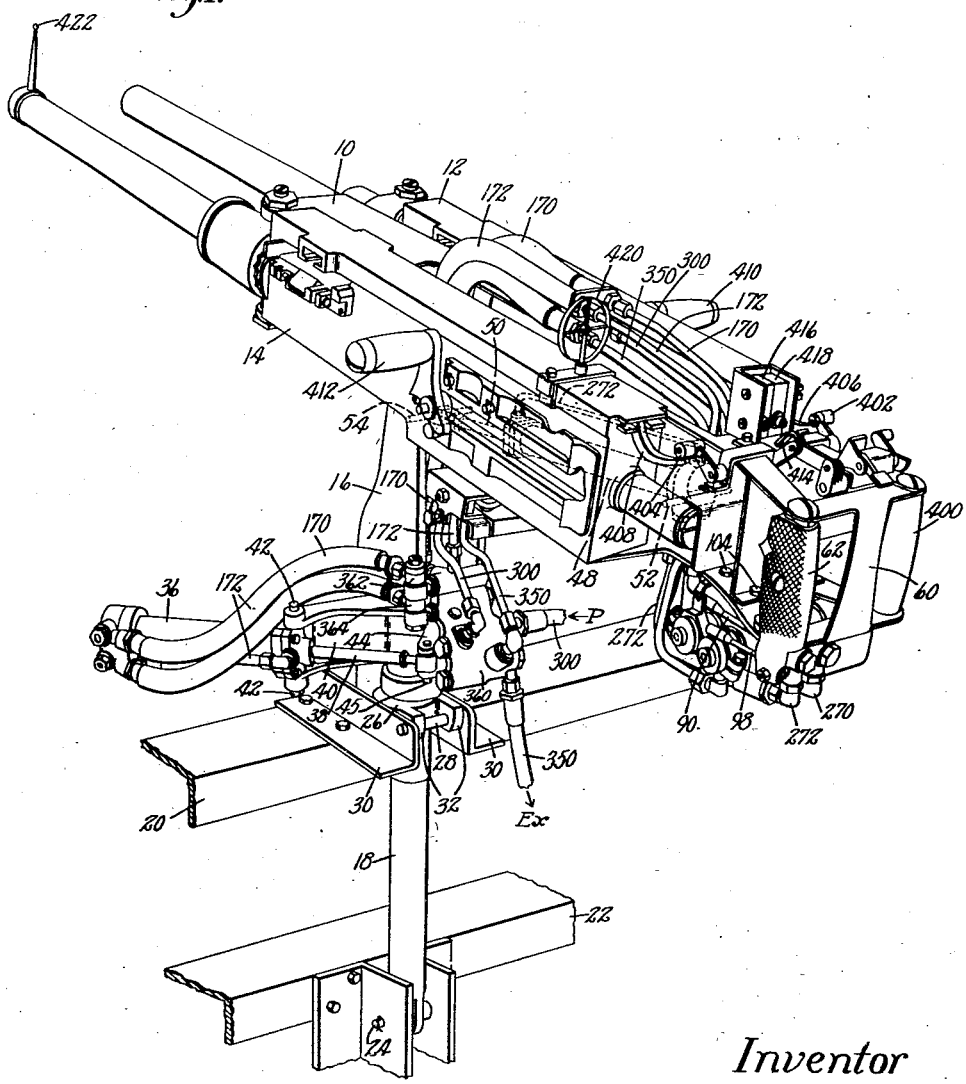
Fig. 1 is a view in perspective of a power-operated gun mount having control mechanism embodying the features of this invention.

Referring to the drawings, and especially Fig. 1 thereof, the gun mount comprises an adaptor 10 on which are mounted two machine guns 12 and 14. The adaptor is pivotally mounted, for movement of the guns in elevation, on the top of a yoke 16, by means of a pivot pin, not shown, which passes through the upper ends of the yoke and into the adaptor. The yoke is rotatably supported, for movement of the guns in azimuth, by means of suitable bearings, not shown, on the upper end of a post 18. This post is mounted on a supporting structure comprising cross members 20 and 22 by means of a pin 24 and a torque block 26, secured to the post, and is held in upright position by means of a pin 28 which passes through two angle irons 30, 30 and also through two ears 32, 32 on the block 26. The pin 28 is removable to permit the post 18 to swing about the pin 24 for stowing the guns.

Figure 6:
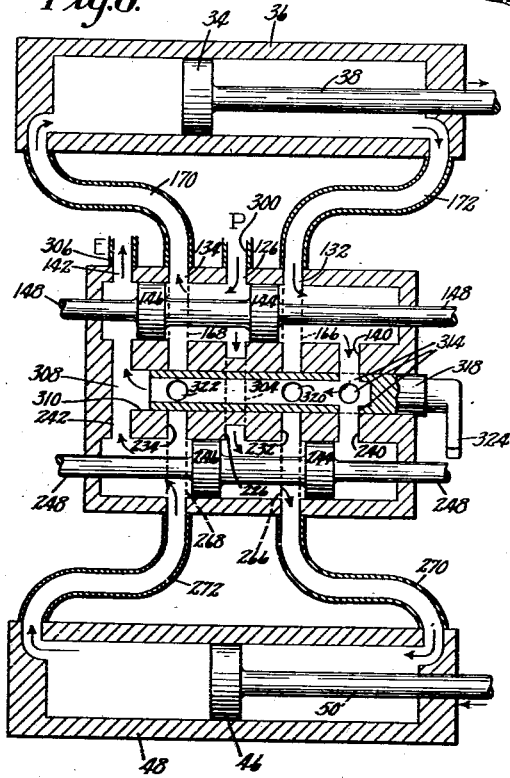
Figs. 6 and 7 are diagrammatic views of the fluid-pressure system for operating the gun mount, showing the control mechanism under two different operating conditions.
Figure 7:
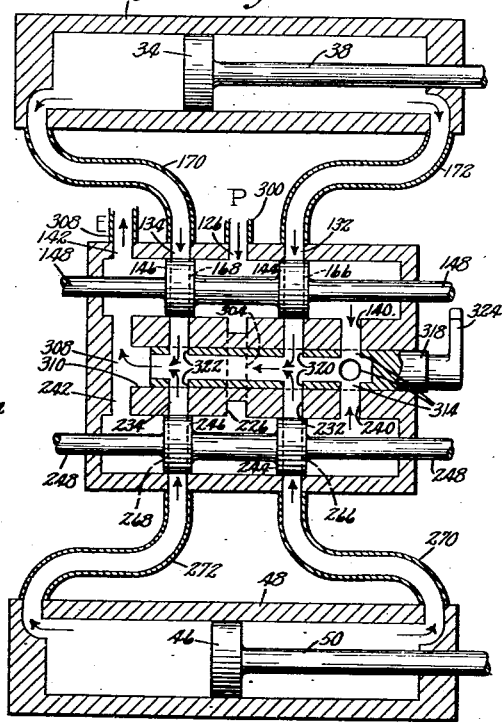

For rotating the yoke 16 about the axis of the post 18, to swing the guns in azimuth, an azimuth motor, comprising a piston 34 operating in a cylinder 36 and having a piston rod 38, is provided, Figs. 1, 6 and 7. This cylinder is supported on a bracket 40, secured to the post 18, by means of trunnion pins 42, 42, and the piston rod is connected to an arm 44, extending from the yoke 16, by means of a pin 45. Movement of the adaptor about the horizontal axis provided by the pin, not shown, which connects the adaptor to the upper ends of the yoke 16, for elevating or depressing the guns, is effected by means of an elevation motor comprising a piston 46, operating in a cylinder 48 and having a piston rod 50, Figs. 1, 6 and 7. The cylinder 48 is mounted on the adaptor by means of a cross pin 52 and the piston rod 50 is similarly connected to the yoke 16 by means of a pin 54. The elevation and azimuth motors are operated by means of fluid under pressure and, as will be apparent, by suitably regulating the flow of pressure fluid to, and its exhaust from these two motors, the movements of the guns in elevation and/or azimuth may be controlled as to direction, speed and extent.

Figure 2:
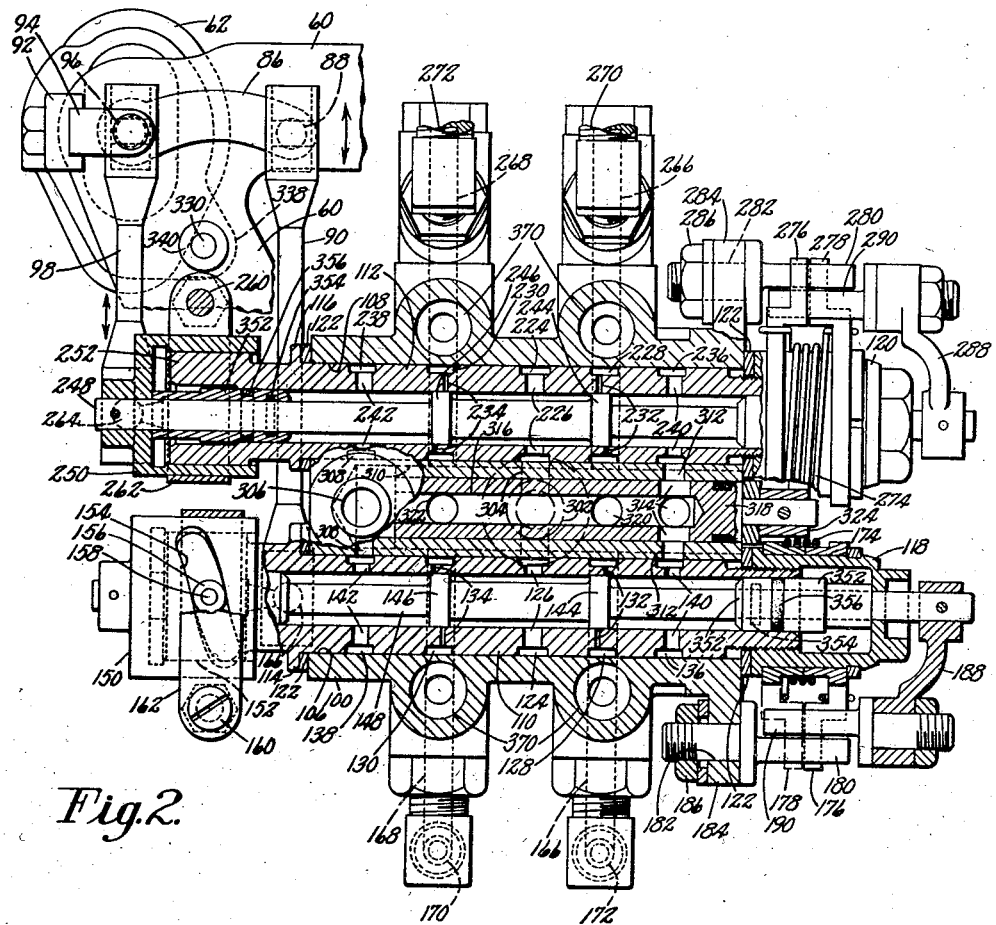
Fig. 2 is a view looking up at the bottom side of the control mechanism and with parts of the control valve shown in section on line II—II of Fig. 5.

Such regulation of the flow of pressure fluid to, and its exhaust from, the elevation and azimuth motors, is, in accordance with the present invention, obtained by means of control mechanism comprising a dual control valve and a common control handle, both of which are carried on a rearwardly extending portion 60 of the adaptor 10. Referring to Figs. 2, 3 and 4 of the drawings, the control handle, designated by the reference character 62, is of hollow construction and is shaped to provide a natural grip for the operator's hand. This handle is mounted on the adaptor extension 60 for universal movement about two axes, which are parallel to the axes about which the guns swing in azimuth and in elevation and which intersect within the body of the handle itself, which is shaped to provide an outer surface adapted to be grasped by the hand of the operator, by means of a cross pin 64 and a rockshaft 66. The rockshaft has reduced ends provided with spherical bearing portions 68, 70 which are journaled in sleeves 72, 74 secured to the adaptor extension 60, and the handle is rotatably mounted on flanged bushings 76, 78 the inner ends of which are pressed against flat surfaces 80, 80 on the rockshaft by means of a head 82 and nut 84 on the pin 64. Pinned to the lowermost end of the rockshaft, below the bushing 74, is an arm 86 to the outer end of which there is connected, by means of a ball joint 88, a control link 90. The handle has a downwardly extending ear 92 carrying a bracket 94 to which is connected, by means of a ball joint 96, a second control link 98. As will be apparent, movement of the control handle about the vertical axis provided by the rockshaft 66 will effect swinging of the arm 86 and a consequent lengthwise movement of the link 90, while movement of the control handle about the horizontal axis provided by the pin 64 will produce a lengthwise movement of the link 98. These movements of the control links are utilized to operate the dual control valves so that the elevation and/or azimuth movements of the gun correspond to the movements of the control handle by the operator, in a manner about to be explained.

Figure 5:
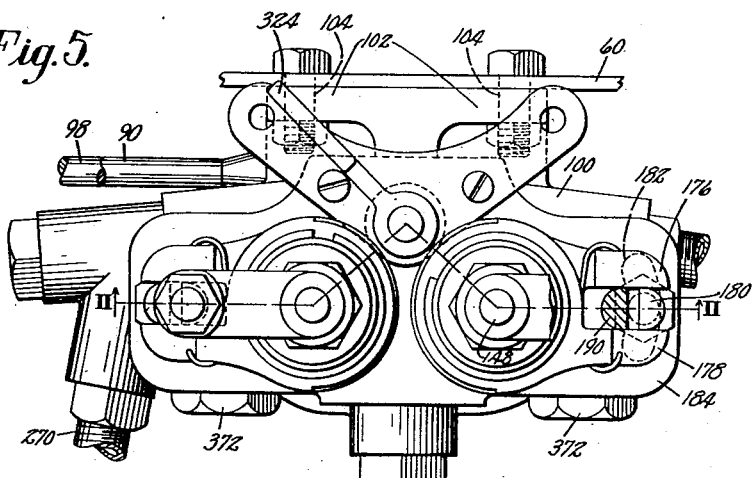
Fig. 5 is a view in elevation of the control valve as viewed from the right-hand side of Fig. 3.

Referring now to Figs. 2, 3 and 5, the dual control valve comprises a casing 100 which is secured to the under side of the adaptor extension 60 by means of attaching flanges 102 and screws 104 (Figs. 1 and 5). This casing is provided with two transverse bores 106 and 108 in which two valve sleeves 110 and 112 are secured by means of their thrust flanges 114, 116 and hollow threaded caps 118, 120, respectively, suitable gaskets 122 being provided at each end to prevent leakage. The sleeve 110 has an inlet groove 124 and inlet ports 126, 126; two outlet grooves 128, 130, and associated ports 132, 134; and two exhaust grooves 136, 138 with ports 140, 142. Flow of pressure fluid through the ports 132, 134 is controlled by two piston portions 144, 146 formed integrally on a stem 148 each end of which extends beyond the opposite ends of the sleeve 110. Pinned to the left-hand end of this stem is a hollow cam 150 which is supported for rotation on a cylindrical portion 152 of the sleeve 110 that extends beyond the casing 100. This cam has cut in it a spiral slot 154 which embraces a cam roller 156 journaled on a pin 158 in the cylindrical extension 152. Clamped to the outer surface of this cam, by means of a bolt 160, is a split ring 162 having an ear 164 (Fig. 3) to which the link 90 is secured by means of a ball joint 166, so that rotation of the control handle 62 about the axis of shaft 66 will effect a lengthwise shifting of the valve stem 148. The outlet grooves 128 and 130, of the valve sleeve 110, are in communication with transverse bores 166, 168, in the casing, and conduits 170, 172 lead from these bores to the opposite ends of cylinder 36 of the azimuth motor, see Figs. 6 and 7.

The cam 150 is yieldingly held in the position shown, Fig. 2, with the piston portions 144, 146 just covering the ports 132, 134, by means of a coil spring 174 the opposite ends of which are bent around the ends of arms 176, 178 that are rotatably mounted on the cap 118. This spring normally holds both of these arms against a stud 180 which is mounted for movement along an arcuate slot 182 in an ear 184 on the valve casing, a nut 186 being provided to hold it in adjusted position. Pinned to the right-hand end of the stem 148 is an arm 188 on which is mounted a stud 190 that is the same thickness as stud 180 and which extends between the arms 176, 178. Rotation of the cam 150, to effect lengthwise movement of the valve stem 148, in either direction, is hence resisted by the spring 174, and by shifting the stud 180, in the slot 182, the at-rest position of the valve stem can be readily adjusted so that the piston portions 144, 146 just cover ports 132, 134. The arrangement is such that when the control handle 62 is rotated to the right, Fig. 1 (clockwise in Fig. 2), pressure fluid is admitted to the left-hand end of cylinder 36, while the right-hand end is exhausted, valve stem 148 being shifted to the left, Figs. 2 and 6. Piston 34 will now be driven to the right, Figs. 1 and 6, and the adaptor and guns will be swung in azimuth in a counterclockwise direction, Fig. 1, and so that the back end of the adaptor, on which the handle 62 is mounted, will move to the right. The same action will take place in the reverse direction if the handle is rotated to the left, Fig. 1 (clockwise in Fig. 2). The speed of movement will be determined by the rate of flow of pressure fluid to and exhaust from the cylinder 36, and ports 132 and 134 are designed to vary this rate very accurately in accordance with the amount of displacement of the valve stem from the neutral position shown in Fig. 2, which in turn is, of course, determined by the angular position of the control handle at any instant. These ports 132 and 134 comprise a series of drilled holes arranged spirally around the sleeve 110. The pitch of the spiral is such that all of the holes are just covered by the piston portions 144 and 146 when the stem is in neutral position. As the stem is displaced more and more holes are uncovered and the rate of flow increased. Preferably, and as shown, those of the holes nearest to the exhaust ports 140, 142, are slightly smaller than those at the other end of the spiral so that the rate of flow of pressure fluid to either end of the cylinder 36 will be somewhat less than the rate of exhaust from the opposite end. This causes the piston 34 to work against a slight back pressure which steadies its action.

The elevation control is similar to that just described, sleeve 112 being provided with an inlet groove 224 and inlet ports 226, 226; two outlet grooves 228, 230 and associated ports 232, 234; and two exhaust grooves 236, 238 with ports 240, 242. Flow of pressure fluid through the ports 232, 234 is controlled by two piston portions 244, 246 formed integrally on a stem 248 each end of which extends beyond the opposite ends of the sleeve 112. Pinned to the left-hand end of this stem is a hollow cam 250 which is supported for rotation on a cylindrical portion 252 of the sleeve 112 that extends beyond the casing 100. This cam has cut in it a spiral cam groove, not shown, which embraces a roller, not shown, similar to the parts 154, 156 and 158 of cam 150. Clamped to the outer surface of the cam 250, by means of a bolt 260, is a split ring 262 having an ear 264 to which the link 98 is secured by means of a ball joint 264, so that rotation of the control handle 62 about the axis of the pin 64 will effect a lengthwise shifting of the valve stem 248. The outlet grooves 228 and 230 are in communication with transverse bores 266, 268 in the casing, and conduits 270, 272 lead from these bores to the opposite ends of the elevation cylinder 48.

The cam 250 is yieldingly held in the position shown, Fig. 2, with the piston portions 244, 246, just covering the ports 232, 234, by means of a coil spring 274 the opposite ends of which are bent around the ends of arms 276, 278 that are rotatably mounted on the cap 120. This spring normally holds both of these arms against a stud 280 which is mounted for movement along an arcuate slot 282 in an ear 284 on the casing, a nut 286 being provided to hold it in adjusted position. Pinned to the right-hand end of the stem 248 is an arm 288 on which is mounted a stud 290 of the same size as stud 280 and which extends between the arms 276, 278. Rotation of the cam 250, to effect lengthwise movement of the stem 248, in either direction, is hence resisted by the spring 274 and by shifting the stud 280, in the slot 282, the at-rest position of this valve stem can be readily adjusted so that the piston portions 244, 246, just cover ports 232, 234.

The operation of the elevation control is similar to that of the azimuth and when the control handle is rotated about pin 64 so that its top end moves forwardly, away from the operator, pressure fluid is admitted to the right-hand end of cylinder 48, Fig. 1, while the left-hand end is exhausted, valve stem 248 being shifted to the right, Figs. 2 and 6. Piston 48 is fixed against movement because of its connection to the yoke 16 and cylinder 48 moves to the right, Fig. 1 and to the left, Fig. 6, and the adaptor and guns are swung in elevation in a counterclockwise direction, Fig. 1, and so that the back end of the adaptor, on which the control handle is mounted, will move up. The same action will take place in the reverse direction when the control handle is rotated in the opposite direction about the axis of pin 64. As is the case with movements of the gun in azimuth, the speed of movement in elevation will be determined by angular position of the control handle at any instant, the ports 232, 234 being constructed and arranged in the same manner as ports 132, 134 to provide for accurate control of the rate of flow of pressure fluid to and exhaust from the cylinder 48 and also to give a slight back pressure on the exhaust.

Pressure fluid is supplied from a pump, not shown, and is conducted by means of a conduit 300 to a pressure port 302, in the casing 100, that is connected to the inlet grooves 124 and 224 by means of a lateral duct 304. The exhaust grooves 142 and 242 are connected with an exhaust port 306, by means of transverse passages 308, 308 and a longitudinal bore 310, while exhaust grooves 140 and 240 are connected to the port 306 by means of ports 312, in the casing, and ports 314 and a longitudinal bore 316 in a dump valve body 318 which is rotatable in the bore 310. The dump valve is also provided with two other sets of diametrically spaced ports 320, 322 which, when the dump valve is rotated 90°, by means of a handle 324, from the position shown in Figs. 2, 5 and 6 to the position shown in Fig. 7, are brought into alinement with the passages 166, 168, 266, 268, respectively, which extend into the bore 310.

As will be seen from an inspection of Fig. 7 with the dump valve in the latter position the opposite ends of both the azimuth cylinder 36 and elevation cylinder 48 are connected directly to the exhaust port 306. This permits manual movement of the guns in the event of damage to, or failure of, any part of the fluid-pressure system which would result in the loss of pressure, and to facilitate such manual operation the control handle 62 may be locked against turning by the engagement of a locking pin 330, slidably mounted in a sleeve 332 mounted on the adaptor extension 60, with a hole 334 in the handle, Fig. 3. The locking pin is held in locking position in the hole 334 by means of a spring 336 and is provided with a crosspin 338 which, when the pin is withdrawn by means of its head 340, moves out of a slot 342 and may be swung over the end of the sleeve to hold the pin in the position shown in Fig. 3, thus freeing the handle for controlling the operation of the azimuth and elevation motors. An exhaust conduit 350 leads from the port 306 to a sump, not shown. To prevent leakage of exhaust fluid from the ends of the sleeves 110 and 112, sealing sleeves 352 are mounted on each end of the valve stems 148 and 248. These sleeves have a sliding fit with the stems and also with the inside of sleeves 110 and 112, and have inside and outside packing rings 354 and 356. This arrangement reduces the frictional resistance to the movement of the stems which slide easily on the smaller inner packing rings.

The conduits 170, 172, 300 and 350 each comprise several sections of metal tubing and flexible hose, see Fig. 1, while conduits 270, 272 are of tubing only. Conduits 300, 350 lead to a header block 360, secured to the yoke 16, and thence to ports 302 and 306 on the valve casing. Conduits 170, 172 lead from the ports 166, 168 in the valve to this header block and thence, through swivel joints 362, 364 to the ends of cylinder 36, as shown, which conduits 270, 270 go directly from the valve to the ends of cylinder 48. These connections are more clearly seen in the diagrammatic views of Figs. 6 and 7, the flexible hose portions of conduits 170 and 172, 300 and 350 being so located as to permit free movement of the adaptor on the yoke and movement of the yoke on the post 18. The valve casing is provided with four other bores 370, communicating with the passages 166, 168, 266, 268, that are close by plugs 372, Fig. 5. These may be used when it is desired to lead pressure inlet and exhaust conduits from the valve in different directions than those shown.

The adaptor extension also is provided with a fixed handle 400 adjacent to which there is a trigger, not shown, which is connected by suitable operating mechanism to two operating rolls 402, 404, which, when the trigger is pulled, depress the sears 406, 408 to fire the guns. The guns are each provided with the usual charging handles 410, 412 and the trigger mechanism includes a member 414 for operating two micro-switches 416, 418 which control the flow of electrical energy to ammunition boosters, not shown. A sight ring 420 and bead 422 are mounted on the left-hand gun.

The operation of the apparatus, which should be understandable from what has already been said, is as follows: With the pump which supplies pressure fluid to the conduit 300 running the gunner grasps the control handle 62 with his left hand and the fixed hand grip 400 with his right. Until the control handle is moved by the operator the springs 174, 274 and cams 150, 250 will hold the valve stems 148, 248 in the positions shown in Fig. 2, and the supply of pressure fluid to, as well as exhaust from, the opposite ends of both the elevation cylinder 48 and azimuth cylinder 36 will be cut off and the guns will be rigidly held against movement in any direction by the pressure fluid trapped in these cylinders. Now by slight wrist movements, in different planes, the operator may rotate the handle about the axis of pin 64, about the axis of shaft 66 or about an axis inclined to either of the aforesaid axes, and as a result of such movement of the control handle the valve stems 148 and 248 will be so displaced that the azimuth and elevation will be started into operation to effect movement of the adaptor 10, and guns 12 and 14, in the same direction as the handle was moved. That is to say, the operator may cause the guns to move simply in elevation or in azimuth, or he may cause them to do both at the same time.

Considering first movement of the control handle in a vertical plane so that it is rotated in a clockwise direction as viewed in Fig. 4, effected by the operator's twisting his wrist, to move the top end of the control handle away from him, by swinging his hand down with respect to his forearm, this will cause a shifting of the valve stem 248 to the right, from its position in Fig. 2, toward that shown in Fig. 6, and cylinder 48 will move to the right, Fig. 1, to the left, Fig. 6, thus lowering the front ends of the guns and raising the back end of the adaptor and with it the control handle and the operator's hand. Now, if the operator does not relax his wrist, the guns, and his hand, will continue to move in the aforementioned direction until the limit of movement of the cylinder 48 has been reached or until the control handle is returned to the position shown in Fig. 4, by the operator positively straightening his wrist. The speed of movement of the gun is governed by the amount of uncovering of the valve ports 232, 234, Fig. 6, showing a wide-open, full-speed position, and this is determined by the angular displacement from neutral position of the control handle and the amount the operator has twisted his wrist. However, if at any time during the movement of the guns the operator slightly relaxes his wrist and holds his forearm fixed, his wrist will straighten, as his hand follows the upward movement of the control handle, and the control handle will thus be returned to the position shown in Fig. 4 and the valve stem 248 to the neutral position of Fig. 2. The same action will take place in the reverse direction if the top of the handle 62 is swung toward the operator by his twisting his wrist to swing his hand up. Now the guns are elevated and the back end of the adaptor moves down. Likewise, swinging movement of the guns to the right or to the left is effected by rotating the handle about the axis of shaft 66 so that the side nearest the operator moves in the direction it is desired to have the back end of the adaptor move. In this case the handle is rotated by the operator's twisting his wrist to swing his hand in the proper direction, and movement of the guns will continue until the handle is positively returned to the neutral position of Fig. 2 by the operator or is brought back by the continued movement of the gun as the operator permits his wrist to straighten. As will be obvious, combined elevation and azimuth movement may be obtained by a movement of the control handle simultaneously about the axis of pin 64 and shaft 66 by a corresponding sidewise and up or down movement of the operator's hand.

In all these different kinds of movement of the guns the operator has continuous control over the direction, speed and extent of movement merely by a slight twisting of his wrist in the appropriate manner. Thus he can bring the guns quickly to bear on a fixed target and, by returning the handle to mid-position, can lock them in this position by the trapped pressure fluid, or he can readily set up a desired and steady rate of gun movement for tracking a moving target by suitably positioning the control handle, and holding his wrist stiff while his forearm follows the movement of the back end of the adaptor, and the tracking rate can be instantly corrected by slight readjustment of the control handle made almost automatically by the operator as he follows the target with his eye through the sights.

When the guns are fired the recoil is likely to cause the back end of the adaptor to jump around and but for the particular way in which the control handle is constructed and mounted such movement of the back end of the adaptor would disturb the setting of the control valves and cause undesired movement of the guns. However, with the control handle mounted to turn about axes intersecting within its body portion, the outer surface of which is grasped by the hand of the operator, the operator's hand surrounds the axes about which the handle is rotated and this difficulty is obviated. This is due to the fact that the operator can readily let his arm follow the movements of the back end of the adaptor while holding his wrist stiff so that his positioning of the handle is unaffected by any jumping around of the adaptor.

The valve stem centering spring arrangement greatly facilitates the proper adjustment of the valve stems 148 and 248 to their proper position in which, when the control handle is locked in its neutral position by the pin 330, the piston portions just cover the ports 132, 134 and 232, 234. This adjustment is made in the following manner: With the control handle locked the bolts 160 and 260 are loosened to free the cams 150 and 250 for turning with their respective valve stems. Now, with the pump running and nuts 186 and 286 loosened, the studs 180 and 280 are each adjusted along their slots 180 and 182, arms 176, 178, 188, 190, spring 174, stem 148, cam 150, and arms 276, 278, 288, 290, spring 274, stem 248, and cam 250, all turning as units, until there is no movement of the gun in any direction. Nuts 186, 286 and bolts 160 and 260 are now tightened and the adjustment is complete.

The built-in dump valve 318 makes it possible instantly to free the azimuth and elevation cylinders, should it be desired for any reason, such as, for example, damage to one or more of the pressure-fluid conduits by enemy fire, to permit manual operation of the guns. This is done merely by swinging the dump valve arm 324 to the right, as viewed in Fig. 5, which places it in the position of Fig. 7. To facilitate hand operation the control handle may be locked by the pin 330 in its mid position and doing this will prevent escape of pressure fluid through any one of the conduits 170, 172, 270, 272 should they happen to be damaged.

Having described the invention, what is claimed as new and desired to secure by Letters Patent of the United States is:

1. In apparatus for controlling the power movements of a device and having a plurality of movable control elements, the combination with said elements, of a control handle having a body portion the outer surface of which is adapted to be grasped by the hand of an operator and mounted on said device for universal movement about two axes which intersect within said body portion of the handle, and means for transmitting movements of said handle to said control elements.

2. In apparatus for controlling the movements of a device by means of a plurality of motors and having a plurality of control elements shiftable to control the operation of said motors, the combination with said elements, of a control handle having a body portion the outer surface of which is adapted to be grasped by the hand of an operator and mounted on said device for movement about two axes which intersect within said body portion of said handle, and means for transmitting movements of said control handle to said control elements.

3. In apparatus for controlling the power movements of a gun mounted for universal movement about two different axes and having a plurality of shiftable control elements, the combination with said elements, of a control handle having a body portion the outer surface of which is adapted to be grasped by the hand of an operator and mounted on said gun for universal movement about two axes that intersect within said body portion of said handle and which are parallel to the axes about which the gun is movable, and means for transmitting movements of said handle to said shiftable control elements.

4. In apparatus for controlling the movements of a gun mounted for universal movement about two different axes by means of a plurality of fluid-pressure-operated motors and having a plurality of valve members shiftable to control the operation of said motors, the combination with said valve members, of a control handle having a body portion the outer surface of which is adapted to be grasped by the hand of an operator and mounted on said gun for universal movement about two axes that intersect within said body portion of said handle and which are parallel to the axes about which the gun is movable, and means for transmitting movements of said handle to said shiftable valve members.

5. In apparatus for controlling the movements of a device by regulating the flow of pressure-fluid to, and exhaust from, a fluid-pressure-operated motor, the combination with a valve having a casing, a spindle shiftable in the casing in opposite directions from a neutral position in which the flow of pressure-fluid to, and exhaust from, the motor is cut off, a cam on one end of the spindle operable, on rotation, to shift the spindle, an arm on the other end of the spindle, a pair of arms rotatably mounted on the casing and having end portions for engaging a projection on the first-named arm, a pin adjustably mounted on the casing, and a spring for normally holding the rotatable arms in engagement with the said projection and against the pin to locate the spindle in neutral position, of a control handle movably mounted on the device, and operating connections between the handle and the cam for transforming movements of the handle into rotation of the cam.

6. In apparatus for controlling the movements of a device by regulating the flow of pressure-fluid to, and exhaust from, a fluid-pressure-operated motor, the combination with a valve having a casing, a spindle shiftable in the casing in opposite directions from a neutral position in which the flow of pressure-fluid to, and exhaust from, the motor is cut off, a cam on one end of the spindle operable, on rotation, to shift the spindle, an arm on the other end of the spindle, a pair of arms rotatably mounted on the casing and having end portions for engaging a projection on the first-named arm, a pin adjustably mounted on the casing, and a spring for normally holding the rotatable arms in engagement with the said projection and against the pin to locate the spindle in neutral position, of a movable control handle, and operating connections between the handle and the cam for transforming movements of the handle into rotation of the cam.

7. In apparatus for controlling the movements of a device by means of a plurality of fluid-pressure-operated motors and having a valve for regulating the flow of pressure-fluid to, and exhaust from, the opposite ends of each motor, each valve including a control member shiftable from a neutral position in which the flow of pressure-fluid to, and exhaust from, both ends of its associated motor is cut off, and a manually operable means for by-passing each control member to connect both ends of each motor to exhaust and thus free the device for manual movement, the combination with said valves, of a control handle movably mounted on the device and operatively connected to the shiftable control members, and means for locking said handle against movement and said shiftable control members in neutral position during manual movement of the device by means of said control handle.

JOHN M. EWART.

REFERENCES CITED

The following references are of record in the file of this patent:

UNITED STATES PATENTS

| Number | Name | Date |
|---|---|---|
| 2,243,364 | Trautman | May 27, 1941 |
| 2,350,946 | Trotter | June 6, 1944 |

(Other references on following page)

UNITED STATES PATENTS

| Number | Name | Date |
|---|---|---|
| 2,350,662 | Adams | June 6, 1944 |
| 2,069,214 | Carlson | Feb. 2, 1937 |
| 2,127,877 | Maglott | Aug. 23, 1938 |
| 1,553,447 | Jackson | Sept. 15, 1925 |
| 2,345,224 | Upp | Mar. 28, 1944 |
| 1,061,701 | Stumpf | May 13, 1913 |
| 2,057,088 | DeMillar | Oct. 13, 1936 |
| 2,319,486 | Austin | May 18, 1943 |
| 407,487 | Maxim | July 23, 1889 |
| 691,254 | Foote | Jan. 14, 1902 |
| 2,237,930 | Dewandre | Apr. 8, 1941 |
| 1,928,915 | Stout | Oct. 3, 1933 |
| 1,147,436 | Ragonnet | July 20, 1915 |
| 2,336,715 | Casler | Dec. 14, 1936 |

FOREIGN PATENTS

| Number | Country | Date |
|---|---|---|
| 694,487 | France | Sept. 16, 1930 |
| 436,071 | Great Britain | June 4, 1935 |